(12) United States Patent
Lee

(10) Patent No.: US 11,327,672 B2
(45) Date of Patent: May 10, 2022

(54) DATA STORAGE DEVICE FOR SEARCHING A LAST ACCESS PAGE AND OPERATION METHOD THEREOF

(71) Applicant: SK hynix Inc., Gyeonggi-do (KR)

(72) Inventor: Jong Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 223 days.

(21) Appl. No.: 16/706,169

(22) Filed: Dec. 6, 2019

(65) Prior Publication Data

US 2020/0326853 A1 Oct. 15, 2020

(30) Foreign Application Priority Data

Apr. 11, 2019 (KR) .......................... 10-2019-0042690

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 9,990,152 B1* | 6/2018 | Hsieh | .................... | G06F 3/0679 |
| 10,007,451 B2* | 6/2018 | Zhang | .................... | G06F 3/0616 |
| 10,061,512 B2* | 8/2018 | Lin | .................... | G06F 12/10 |
| 10,223,029 B2* | 3/2019 | Gorobets | ................ | G11C 29/70 |
| 2008/0082596 A1* | 4/2008 | Gorobets | ............ | G06F 12/0253 |
| 2015/0199149 A1* | 7/2015 | Sankaranarayanan | | G06F 3/0611 711/102 |
| 2017/0038981 A1* | 2/2017 | Karamcheti | .......... | G06F 3/0611 |
| 2018/0101302 A1* | 4/2018 | Lin | .................... | G11C 16/105 |
| 2018/0101454 A1* | 4/2018 | Lee | .................... | G06F 3/064 |
| 2018/0136859 A1* | 5/2018 | Hsieh | .................... | G06F 7/535 |
| 2019/0236005 A1* | 8/2019 | Lee | .................... | G06F 11/108 |
| 2019/0310923 A1* | 10/2019 | Jun | .................... | G06F 11/27 |

FOREIGN PATENT DOCUMENTS

| | | |
|---|---|---|
| KR | 1020170130657 | 11/2017 |
| KR | 1020180023190 | 3/2018 |

* cited by examiner

*Primary Examiner* — Christopher D Birkhimer
(74) *Attorney, Agent, or Firm* — IP & T Group LLP

(57) ABSTRACT

A data storage device may include a storage including a plurality of dies each including a plurality of memory blocks including a plurality of pages, and a controller configured to select at least one memory block from each of the dies to configure a block group, configure a page group with pages having an equal offset in each memory block in each block group, and access the storage in a die interleaving manner. The controller may be configured to detect an open block group as power is supplied after sudden power off, set search sections for each die including a plurality of blocks in the detected open block group, and search for a last access page by simultaneously accessing the search sections for each die.

19 Claims, 15 Drawing Sheets

… (1)

DATA STORAGE DEVICE FOR SEARCHING A LAST ACCESS PAGE AND OPERATION METHOD THEREOF

CROSS-REFERENCE TO RELATED APPLICATION

The present application claims priority under 35 U.S.C. § 119(a) to Korean application number 10-2019-0042690, filed on Apr. 11, 2019, which is incorporated herein by reference in its entirety.

BACKGROUND

1. Technical Field

Various embodiments generally relate to a semiconductor integrated apparatus, and more particularly, to a data storage device and an operation method thereof.

2. Related Art

A storage device is electrically connected to a host and performs a data input/output operation at a request of the host. The storage device may use any of various storage media to store data.

The storage device may be a device that stores data in a magnetic disk, such as a hard disk drive (HDD), or a device that stores data in a semiconductor memory apparatus, particularly, a nonvolatile memory, such as a solid state drive (SSD) or a memory card.

A storage medium using a flash memory has advantages such as large capacity, nonvolatility, low unit cost, low power consumption, and high data processing speed.

SUMMARY

In an embodiment, a data storage device may include: a storage including a plurality of dies, each including a plurality of memory blocks, each including a plurality of pages; and a controller configured to select at least one memory block from each of the dies to configure a block group, configure a page group with pages having a same offset in each memory block in each block group, and access the storage in a die interleaving manner, wherein the controller is configured to detect an open block group as power is supplied after sudden power off, set search sections for each die including a plurality of blocks in the detected open block group, and search for a last access page by simultaneously accessing the search sections for the dies.

In an embodiment, an operation method of a data storage device, which includes a plurality of dies, each including a plurality of memory blocks, each including a plurality of pages, and a controller is configured to select at least one memory block from each of the dies to configure a block group, configure a page group with pages having an equal offset in each memory block in each block group, and access the storage in a die interleaving manner, the operation method comprising: supplying power after sudden power off; detecting, by the controller, an open block group and setting search sections for each die including a plurality of blocks in the detected open block group; and searching, by the controller, for a last access page by simultaneously accessing the search sections for the dies.

In an embodiment, an operation method of a data storage device, which includes dies, each including memory blocks, each including pages, and a controller, the method comprising: supplying power to the data storage device after a sudden power off; setting, by the controller, a search area for each of the dies, the search areas spanning multiple blocks of an open block group, each search area including pages having different offsets; and accessing the search areas simultaneously, by the controller, to search for a last access page; wherein a reset area is defined for a subsequent search based on whether or not midpoint pages in the search areas are all empty pages, valid pages or a combination thereof, as determined in the accessing operation.

DETAILED DESCRIPTION

A data storage device and an operation method thereof are described in more detail with reference to the accompanying drawings. Throughout the specification, reference to "an embodiment" or the like is not necessarily to only one embodiment, and different references to any such phrase are not necessarily to the same embodiment(s).

Also, open-ended terms, such as "comprising" and "including" are intended to refer to the stated elements or steps in a non-exclusive manner, meaning that other elements or steps may be combined with the stated elements or steps. Similarly, a singular reference, e.g., "a" or "an," is intended to include the plural, unless the context clearly indicates otherwise.

Figure 1:
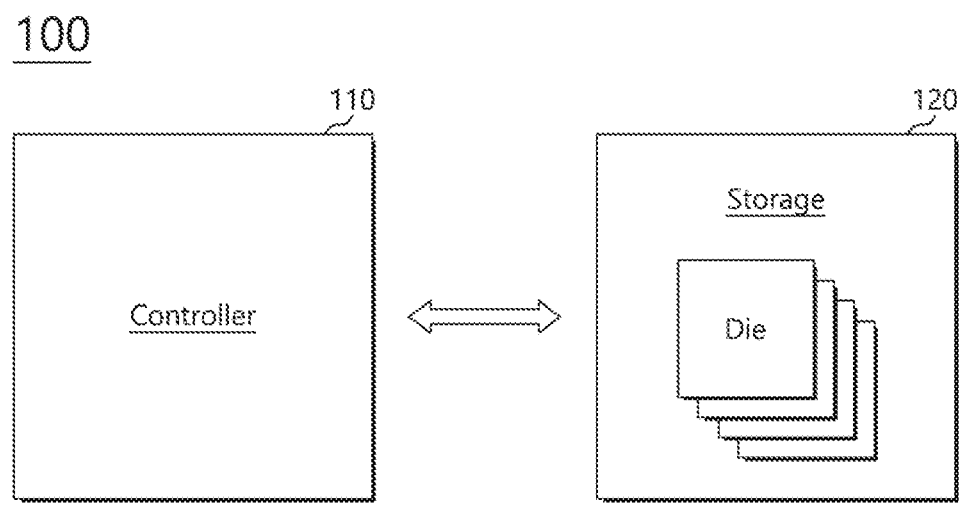
FIG. 1 is a diagram illustrating a configuration of a data storage device in accordance with an embodiment.

FIG. 1 is a diagram illustrating a configuration of a data storage device in accordance with an embodiment.

Referring to FIG. 1, a data storage device 100 may include a controller 110 and a storage 120, and operates under the control of a host device.

The controller 110 may control the storage 120 in response to a request from the host device. For example, the controller 110 may control programming of data in the storage 120 according to a write request of the host device. Furthermore, the controller 110 may provide the host device with the data written in the storage 120 in response to a read request of the host device.

The storage 120 may write data or output the written data under the control of the controller 110. The storage 120 may include a volatile or nonvolatile memory apparatus. In an embodiment, the storage 120 may be implemented using any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin torque transfer magnetic RAM (STT-MRAM). The storage 120 may include a plurality of dies Die 0 to Die n, a plurality of chips, and/or a plurality of packages. In addition, the storage 120 may include single-level cells, each of which stores one-bit data in one memory cell or a multi-level cells, each of which stores multi-bit data.

In an embodiment, the storage 120 may have a die-plane-block-page hierarchical structure in which each page includes a plurality of memory cells, each block includes at least one page, each plane includes at least one block, and each die includes at least one plane.

Although not illustrated in the drawing, the storage 120 may include a system region and a user region. The system region may store various types of system data for an operation of the storage 120. The system data is data used for executing firmware and may include various types of data such as a map table and initialization information, operation bias information, operation timing information, bad block information, repair information, and operation state information of the storage 120.

The user region of the storage 120 may include a plurality of user data blocks for storing write data received from the host device. The controller 110 may select one of the user data blocks and control the storage 120 to store the write data received from the host device in a corresponding block. The user data block selected and in use by the controller 110 may be referred to as an open block, and a completely used memory block may be referred to as a closed block.

Figure 2:
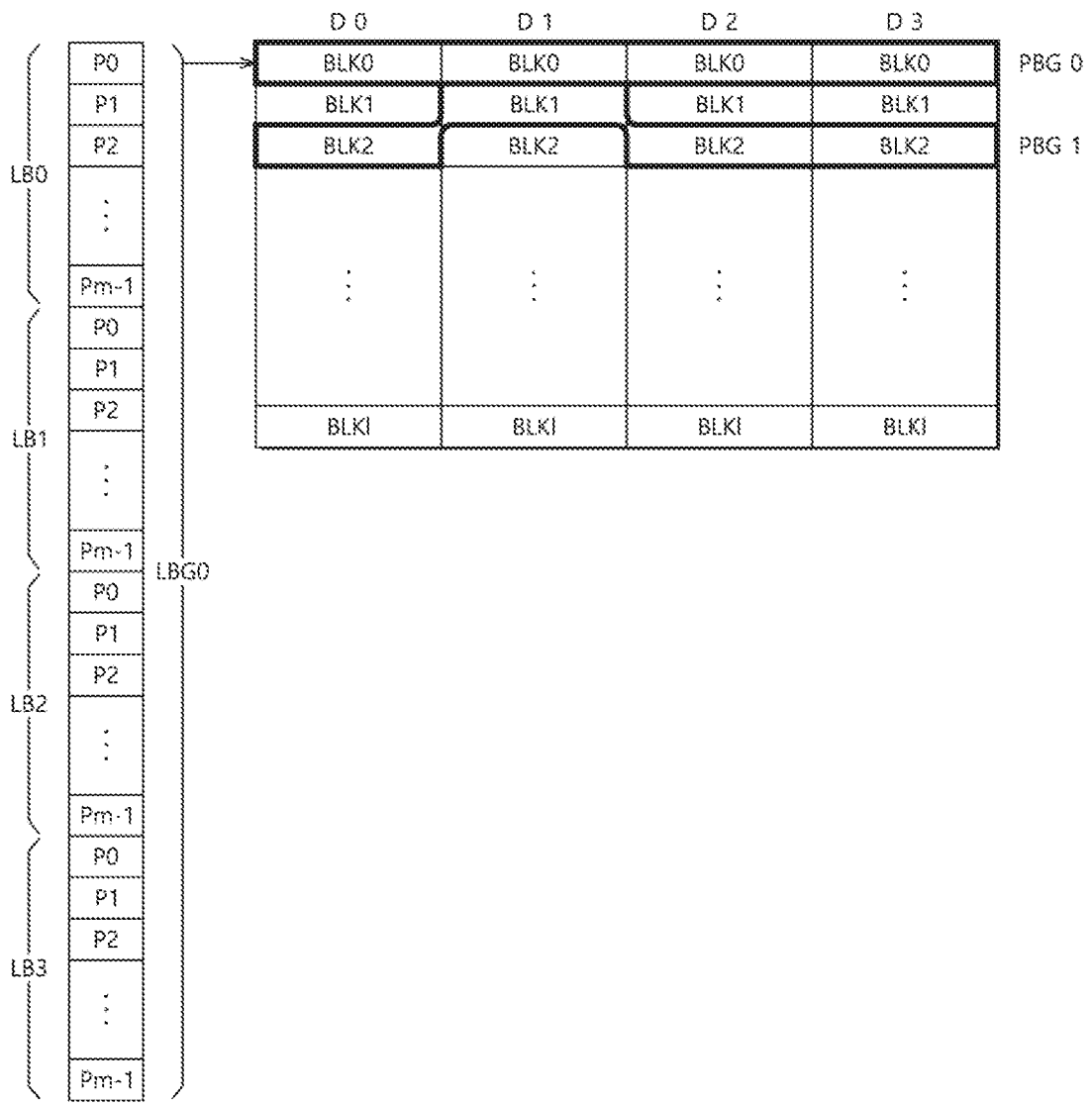
FIG. 2 is a diagram illustrating a configuration of a storage in accordance with an embodiment.

FIG. 2 is a diagram illustrating a configuration of the storage 120 in accordance with an embodiment.

Referring to FIG. 2, the storage 120 may include a plurality of dies D1 to D3, each of which may include a plurality of memory blocks BLK0 to BLKI.

In order to maximize parallelism for a request of the host device, the controller 110 may improve a processing speed by writing data to the storage 120 in units of logical block groups (e.g., LBG0 and others) obtained by combining a plurality of logical blocks. In the case of LBG0, logical blocks LB0 to LB3 are combined. In an embodiment, the number of logical blocks, e.g., LB0 to LB3, in a given logical block group, e.g., LBG0, is the same as the number of dies constituting the storage 120.

In an embodiment, the controller 110 may select at least one memory block from each of the dies D1 to D3 to configure physical block groups PBG0, PBG1, and map the logical block groups LBG0, . . . to respective physical block groups PBG0, . . . PBG1, for management. Memory blocks included in the physical block groups PBG0, PBG1, . . . may have the same offset (e.g., the memory blocks in PBG0 all have the same offset) or different offsets (e.g., the memory blocks in PBG1 have different offsets).

Furthermore, the controller 110 maps logical pages P0 to Pm-1 of each of the logical blocks LB0 to LB3 constituting the logical block groups LBG0, to physical pages in the corresponding physical block group PBG0, as indicated in FIG. 2. In an embodiment, the controller 110 may configure logical page groups with pages P # having the same offset from the logical blocks LB0 to LB3 included in one logical block group LBG0. Then, the controller 110 may configure physical page groups by selecting pages having the same offset or different offsets from the memory block BLK0 of the physical block group PBG0 corresponding to the logical block group LBG0. Accordingly, the logical page groups may be mapped to the physical page groups, respectively, and the controller 110 may access the storage 120 in an interleaving manner with respect to the logical page groups.

Figure 3:
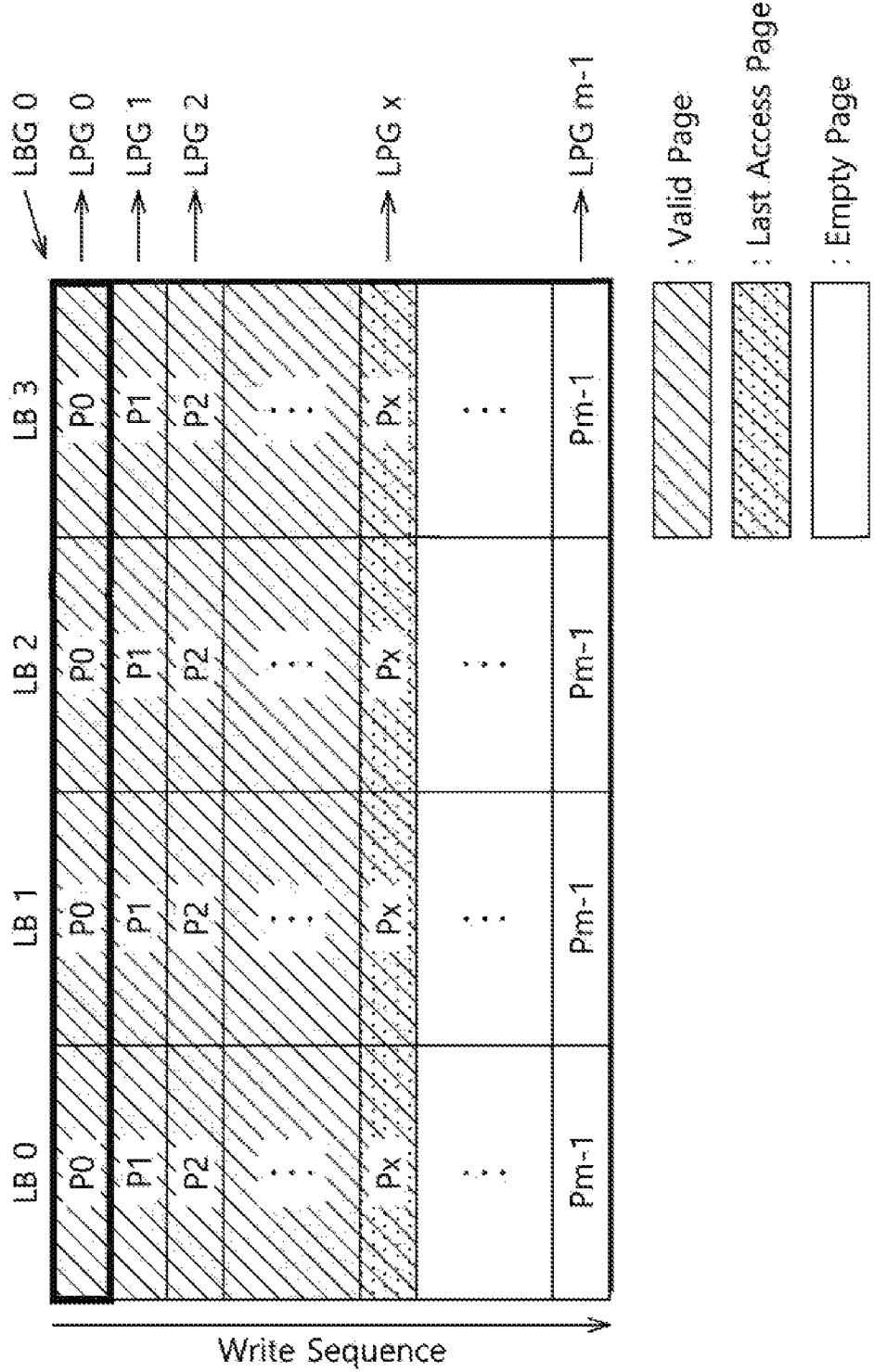
FIG. 3 is a diagram for describing a logical storage concept of data.

FIG. 3 is a diagram for describing a logical storage concept of data.

Referring to FIG. 3, the pages P # having the same offset from the logical blocks LB0 to LB3 in the logical block group LBG0 may be grouped to form logical page groups LPG0 to LPGm-1.

Data to be written may be written sequentially from the first page of the logical page groups LPG0 to LPGm-1.

FIG. 3 illustrates that a logical page where data is successfully stored is classified as a valid page and a logical page where no data is stored is classified as an empty page.

Sudden power off (SPO) may occur during an operation of writing data, and a logical page group LPGx accessed for writing at the time of the occurrence of the SPO may be referred to as a last access page.

In the following description, a page is a logical page and a block is a logical block unless otherwise specified.

In general, the controller 110 generates a physical address to logical address (P2L) list for a closed block in which a write operation has been completed, stores the P2L list in an address mapping table in the RAM provided in the controller 110, and backs up the P2L list to the storage 120. In such a case, the controller 110 does not generate the P2L list for an open block, in which a write operation is in progress, until the write operation is completed, generates the P2L list after the write operation is completed, and stores the P2L list in the address mapping table.

In order to generate the P2L list, the controller 110 may sequentially scan from the last page to the first page of the closed block, and map a physical page address (PPA) stored in each page to a logical page address (LPA) of a corresponding logical page, thereby generating the physical address to logical address (P2L) list for the closed block.

While a write operation is in progress for a specific memory block, the write operation may be forcibly interrupted due to unexpected power supply interruption, that is, the occurrence of the SPO. Then, when the data storage device 100 is powered on, the controller 110 may generate the P2L list for valid pages of an open block in which the write operation is being performed, and store the P2L list in the address mapping table.

In the data storage device 100 that performs a write operation for a plurality of dies in an interleaving manner, in order to generate the P2L list for an open block group in which the write operation was in progress at the time of the occurrence of the SPO, the controller 110 in accordance with an embodiment may set search sections or search areas for each die with respect to each of a plurality of memory blocks in the open block group such that the search sections for each die do not include pages having the same offset, that is, offsets of pages i in the search section for a given die do not overlap.

In an embodiment, the controller 110 may set search sections for each die such that each search section includes a plurality of pages having consecutive page offsets for respective memory blocks in the block group. That is, the page offsets in a given search section do not overlap each other.

In an embodiment, when the number of blocks included in the block group, that is, the number of dies is N and the number of pages in each memory block is m, the controller 110 may set m/N pages having consecutive page offsets as search sections for each die. In such a case, when setting an area from [(m/N)*X) to (m/N)*(X+1)] as the search section for each die with respect to a memory block of an $x^{th}$ die, the controller 110 may set search sections having a plurality of consecutive pages for each memory block without overlapping of page numbers.

When the search sections are set for each die of the open block group, the controller 110 may simultaneously perform recovery read operations of reading data from each search section of each die according to a particular manner and searching for a last access page.

In an embodiment, the controller 110 may sequentially read data from the first page of each search section of each die and search for a last access page.

While reading data sequentially from the first pages of the search sections for each die for the purpose of a recovery read, when a valid page is found from a specific die and an invalid page is found from the same die, the controller 110 may determine the valid page of the corresponding die as a last access page.

In an embodiment, the controller 110 may search for a last access page starting from midpoint pages of each search section of each die.

When the midpoint pages of the search sections accessed for recovery read are all empty pages, i.e., not valid pages, the controller 110 may reset a search section for a reset area which is an area up to the midpoint pages. In an embodiment, the reset area may be an area from the first page of a memory block to an immediately preceding page of the smallest page number among the midpoint page numbers per search section, and the controller 110 may reset a search section for this reset area.

When the midpoint pages accessed for the recovery read are all valid pages, the controller 110 may reset a search section for a reset area after the corresponding midpoint page. In an embodiment, the reset area may be an area from a subsequent page immediately after the largest page number among the midpoint page numbers for each die to the last page of the memory block, and the controller 110 may reset a search section for this reset area.

When some of the midpoint pages accessed for the recovery read are valid pages, that is, when some are valid pages and others are empty pages, the controller 110 may reset a search section for a reset area between a subsequent page immediately after the largest page number among page numbers of the valid pages found and an immediately preceding page of the smallest page number among page numbers of the empty pages found.

When the search section is reset, the controller 110 may repeatedly perform the search process until the last access page is found by repeating the process of reading the midpoint page in the reset search section and resetting a search section.

However, when the number of pages included in the search section reset area is less than a minimum value MIN, the controller 110 may set the entire die, that is, the reset area of the entire block group as a search section instead of resetting the search section for each die, and search for a last access page sequentially from the first page or in a binary search manner.

When the last access page is found through such a search process, the controller 110 may sequentially scan from the immediately preceding page of the last access page to the first page of the memory block and map a physical page address (PPA) stored in each page to a logical page address (LPA) of a corresponding page, thereby generating a physical address to logical address (P2L) list for an open block at the time of occurrence of the SPO.

Figure 4:
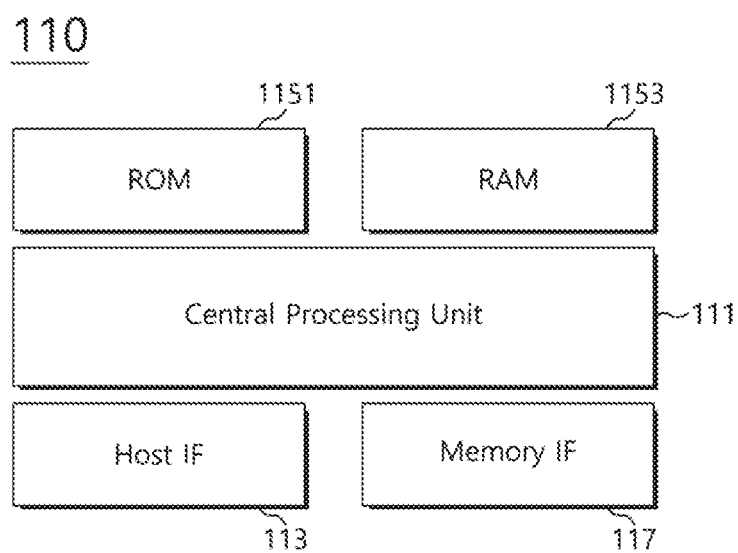
FIG. 4 is a diagram illustrating a configuration of a controller in accordance with an embodiment.

FIG. 4 is a diagram illustrating a configuration of the controller in accordance with an embodiment.

Referring to FIG. 4, the controller 110 may include a central processing unit 111, a host interface (IF) 113, a ROM 1151, a RAM 1153, and a memory interface (IF) 117.

The central processing unit 111 may be configured to transfer various types of control information used for a data read or write operation for the storage 120 to the host IF 113, the RAM 1153, and the memory IF 117. In an embodiment, the central processing unit 111 may operate according to firmware provided for various operations of the data storage device 100. In an embodiment, the central processing unit 111 may perform a function of a flash translation layer (FTL) for performing address mapping, wear leveling or the like for managing the storage 120, a function of detecting and correcting an error of data read from the storage 120, or the like.

The host IF 113 may provide a communication channel for receiving a command and a clock signal from the host device and controlling data input/output under the control of the central processing unit 111. The host IF 113 may provide a physical connection between the host and the data storage device 100. Furthermore, the host IF 113 may provide interfacing with the data storage device 100 corresponding to a bus format of the host device. The bus format of the host device may include at least one of standard interface protocols, such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and/or a universal flash storage (UFS).

The ROM 1151 may store program codes for the operation of the controller 110, for example, firmware or software, and store code data or the like used by the program codes.

The RAM 1153 may store data for the operation of the controller 110 or data, such as a map table, generated by the controller 110.

The memory IF 117 may provide a communication channel for signal transmission/reception between the controller 110 and the storage 120. The memory IF 117 may write data, which has been received through the host IF 113, in the storage 120 under the control of the central processing unit 111. Furthermore, the memory IF 117 may transfer data read from the storage 120 to the host IF 113.

The central processing unit 111 may configure block groups including blocks of the same number as that of dies, configure a page group with pages having the same offset in each memory block in each block group, and control the storage 120 in a die interleaving manner.

The central processing unit 111 may also search for an open block group as power is supplied after sudden power off. Then, the central processing unit 111 may set search sections for each die to exclude pages having the same offset for each of a plurality of memory blocks in the open block group, simultaneously access the search sections of each die, and search for a last access page of the open block group.

In an embodiment, the central processing unit 111 may sequentially read data from the first pages of the search sections for each die and search for a last access page. When pages with different program states are consecutively read from a search section of a specific die and offsets of the consecutively read pages are continuous, the central processing unit 111 may determine a valid page of the consecutively read pages as a last access page; however, the present invention is not limited thereto.

In an embodiment, the central processing unit 111 may search for a last access page in the open block according to whether a midpoint page in each search section is a valid page or an empty page.

In an embodiment, when only empty pages are found as a result of reading the midpoint pages of search sections for each die, the central processing unit 111 may repeat a process of resetting search sections for each die with respect to an area up to the midpoint pages and reading the midpoint pages of the search sections for each die, until at least one valid page is found.

When only valid pages are found as the result of reading the midpoint pages of the search sections for each die, the central processing unit 111 may repeat a process of resetting search sections for each die with respect to an area after the midpoint pages and reading the midpoint pages of the search sections for each die, until at least one empty page is found.

When one or more valid pages and one or more empty pages are found as the result of reading the midpoint pages of the search sections for each die, the central processing unit 111 may repeat a process of resetting search sections for each die with respect to an area between an area after the valid page and an area before the empty page and reading the midpoint pages of the search sections for each die, until a last access page is found.

In an embodiment, when pages with different program states are consecutively read during the search process and offsets of the consecutively read pages are continuous, the central processing unit 111 may determine a valid page of the consecutively read pages as a last access page; however, the present invention is not limited thereto.

FIG. 5 to FIG. 10 are flowcharts for describing an operation method of the data storage device in accordance with an embodiment.

Figure 5:
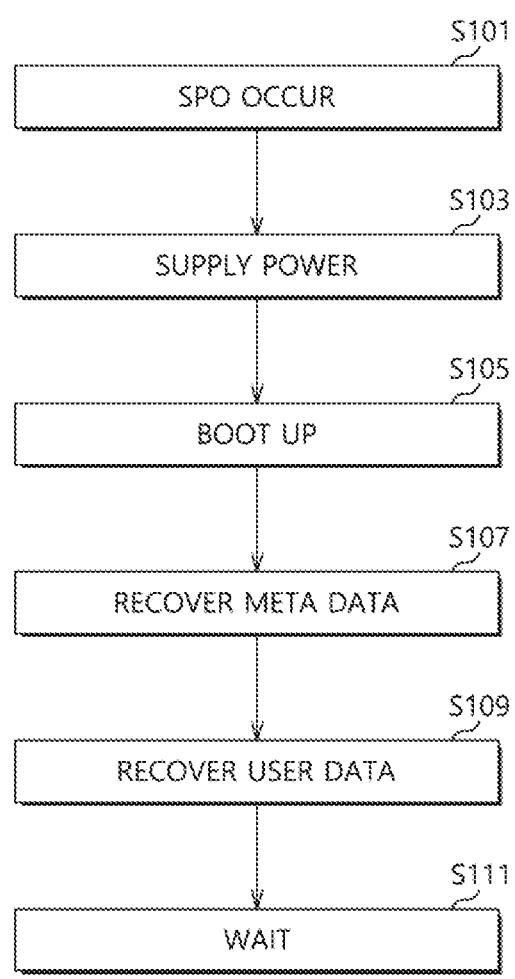
FIG. 5 to FIG. 10 are flowcharts illustrating an operation method of the data storage device in accordance with an embodiment.

FIG. 5 is a flowchart for describing the operation method of the data storage device according to the resupply of power after the sudden power off.

Referring to FIG. 5, after the sudden power off (S101), as power is resupplied (S103), the controller 110 may boot up the data storage device 100 (S105). The boot operation may include an operation for loading a boot loader from the ROM 1151 to the RAM 1153 of the controller 110 and an operation for performing boot-up by loading code type instructions from the storage 120 to the RAM 1153 by using the boot loader.

When the boot is completed, the controller 110 may recover meta data stored in the storage 120 (S107) and recover user data (S109). In an embodiment, the process (S107 and S109) of recovering the data may include a process of reading the system data from the storage 120, loading the read system data to the RAM 1153, finding an open block used at the time of occurrence of the SPO based on the system data, searching for a last access page, sequentially reading data written to pages before the last access page to generate a P2L list, and storing the P2L list in the RAM 1153.

When the data stored in the storage 120 is recovered, the data storage device 100 waits in a state available to the host device (S111).

Figure 6:
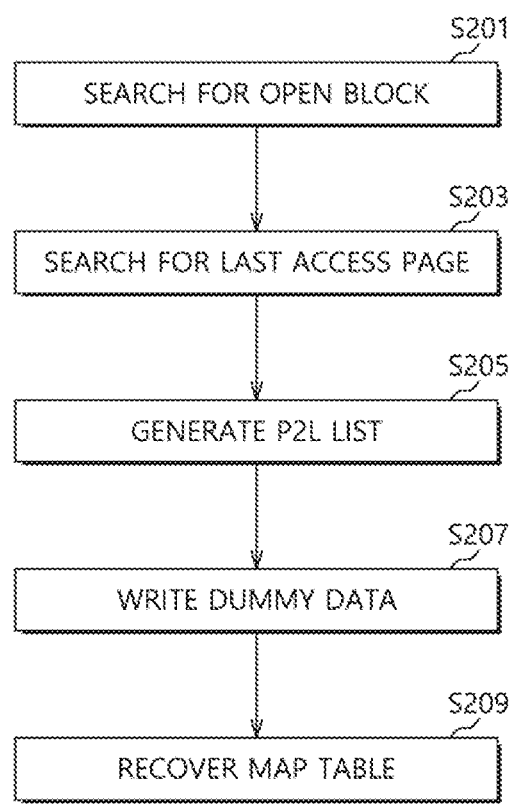

FIG. 6 is a flowchart for describing the data recovery process in accordance with an embodiment.

Referring to FIG. 6, the controller 110 may search for the open block used at the time of occurrence of the SPO on the basis of the system data loaded from the storage 120 to the RAM 1153 (S201).

When the open block is found, the controller 110 may search for the last access page in the open block (S203). Then, the controller 110 may generate the P2L list by sequentially reading from the last access page to the first page (S205).

Furthermore, the controller 110 may write dummy data to each page from a subsequent page immediately after the last access page of the open block to the last page, and make the open block a closed block (S207).

Then, the controller 110 may generate a P2L list for the closed block by sequentially scanning from the last page to the first page, store the P2L list in the RAM 1153, and recover a map table (S209).

The last access page search process illustrated in step S203 may be configured as illustrated in FIG. 7 to FIG. 10.

FIG. 7 to FIG. 10 are flowcharts for describing the last access page search process in accordance with an embodiment.

Figure 7:
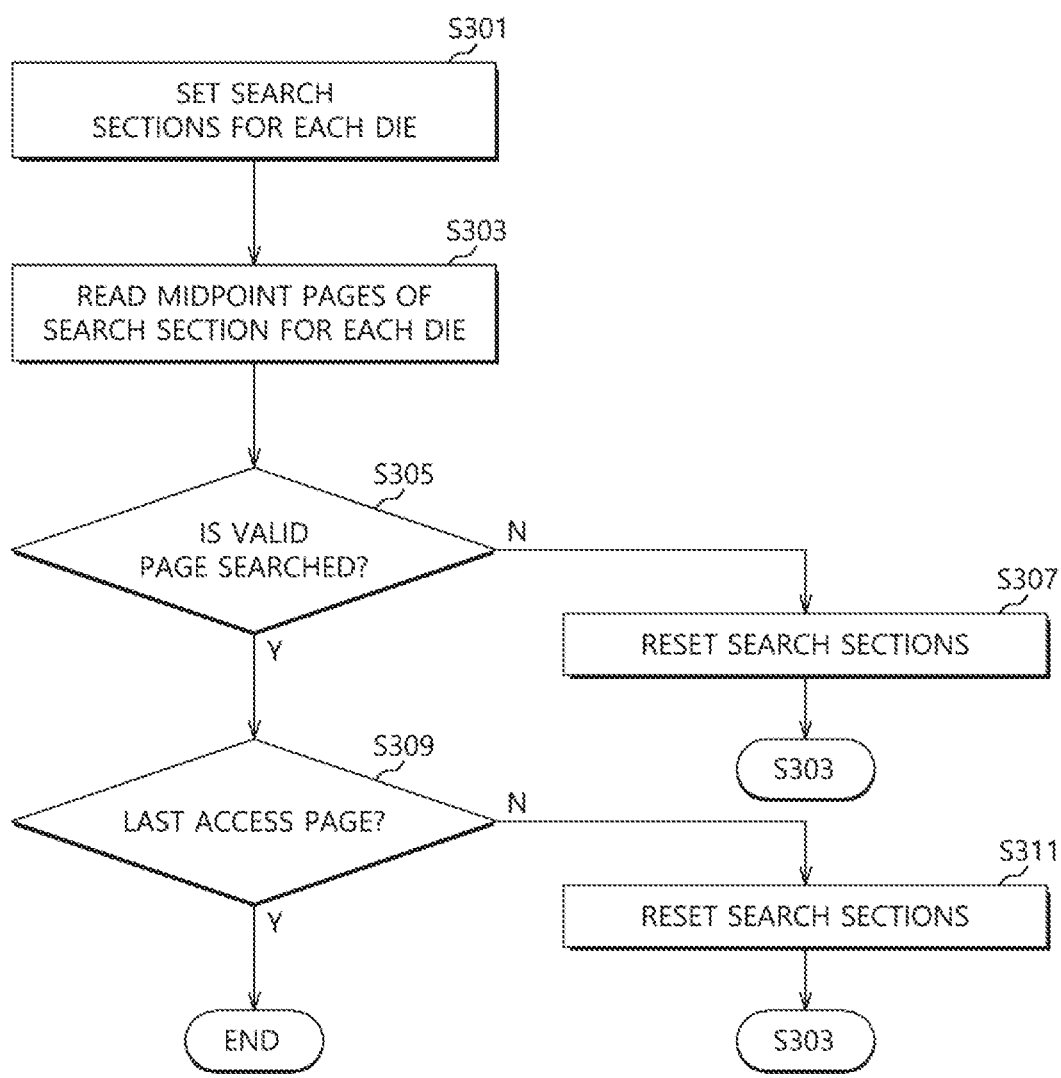

Referring to FIG. 7, the controller 110 may set the search sections for each die with respect to each of the memory blocks in the open block group such that the search sections for each die include a plurality of pages having consecutive page offsets and the offsets of the pages included in the search sections for each die do not overlap between the search sections (S301).

In an embodiment, when the number of blocks included in the block group, that is, the number of dies is N and the number of pages in each memory block is m, the controller 110 may set m/N pages having consecutive offsets for each die as search sections. In such a case, when setting an area from $[(m/N)*X]$ to $(m/N)*(X+1)]$ as a search section for each die with respect to a memory block of an $X^{th}$ die, the controller 110 may set search sections having a plurality of consecutive pages for each memory block without overlapping page numbers.

When the search sections are set for each die of the open block group, the controller 110 may perform a recovery read operation of reading midpoint pages of each search section (S303).

As a result of reading the midpoint pages, the controller 110 may check whether at least one valid page is found (S305).

When the midpoint pages accessed for the recovery read are all empty pages, i.e., not valid pages (S305: N), the controller 110 may reset search sections (S307) and repeat such a process until at least one valid page is found in the search sections.

As the result of reading the midpoint pages, when the at least one valid page is found (S305: Y), the controller 110 may check whether the found valid page is a last access page (S309). When the last access page is found (S309: Y), the controller 110 may terminate the search process. However, when the last access page is not found (S309: N), the controller 110 may reset search sections (S311) and repeat such a process until the last access page is found.

Figure 8:
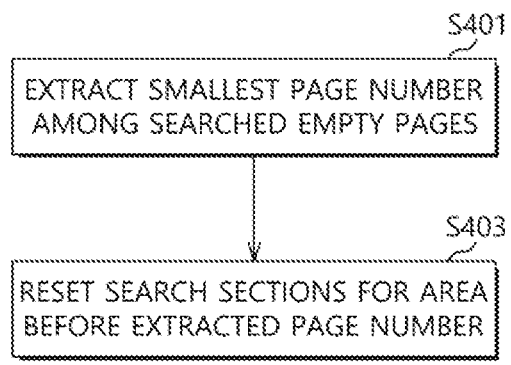

FIG. 8 illustrates a search section reset process when empty pages are found as the result of reading all the midpoint pages of the search sections.

Referring to FIG. 8, when the empty pages are found in all the midpoint pages of the search sections for each die, the controller 110 may extract the smallest page number among the midpoint page numbers of the search sections for each die (S401).

Since all pages after an area corresponding to the smallest page number among the midpoint page numbers of the search sections for each die may be determined to be empty pages, the controller 110 may set, as a reset area, an area before the page number extracted in step S401, that is, an area from the first page of the memory block to is an immediately preceding page of the smallest page number among the midpoint page numbers for each die, and reset search sections for this reset area (S403). After the search sections are reset, the controller 110 may proceed to step S303 of FIG. 7 to perform the subsequent process.

Figure 9:
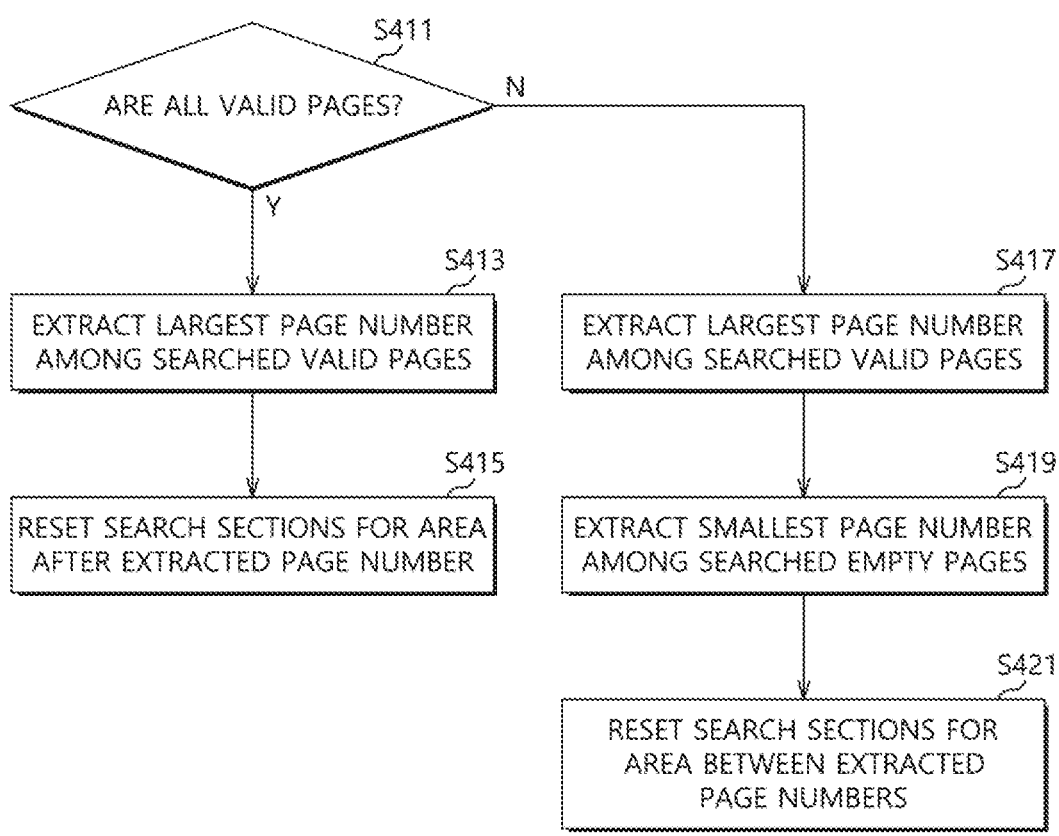

FIG. 9 illustrates a search section reset process when at least one valid page is found as the result of reading the midpoint pages of the search sections.

Referring to FIG. 9, the controller 110 may check whether all the midpoint pages of the search sections for each die are valid pages (S411). If so (S411: Y), the controller 110 may extract the largest page number among the midpoint page numbers of the search sections for each die (S413).

Since a specific page after the midpoint pages of the search sections for each die may be expected to be a last access page, the controller 110 may set, as a reset area, an area after the page number extracted in step S413, that is, an area from a subsequent page immediately after the largest page number among the midpoint page numbers for each die to the last page of the memory block, and reset search sections for the reset area (S415). After the search sections are reset, the controller 110 may proceed to step S303 of FIG. 7 to perform the subsequent process.

On the other hand, when some of the midpoint pages of the search sections for each die are valid pages and others are empty pages (S411: N), the controller 110 may expect that a last access page will exist between the found valid pages and empty pages.

Therefore, the controller 110 may extract the largest page number of valid pages (S417) and extract the smallest page number of empty pages (S419).

Then, the controller 110 may set an area between the page number extracted in step S417 and the page number extracted in step S419 as a reset area, and reset search sections for the reset area (S421). After the search sections are reset, the controller 110 may proceed to step S303 of FIG. 7 to perform the subsequent process.

When the search sections are reset in FIG. 8 and FIG. 9, the search sections may be reset for each die or the entire block group on the basis of the number of pages included in the reset area, which is described below with reference to FIG. 10.

Figure 10:
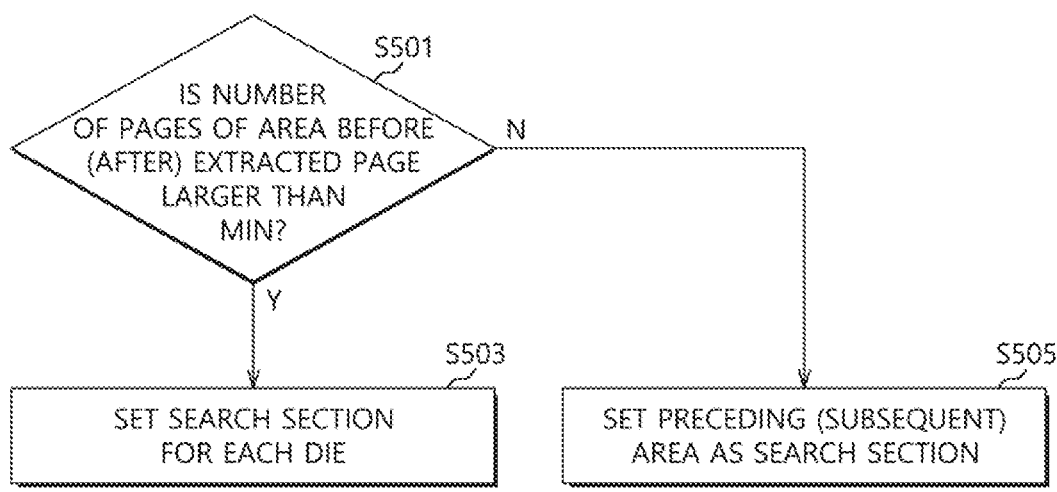

Referring to FIG. 10, when the number of pages included in the reset area is less than a minimum value MIN (S501: N), the controller 110 may set the entire die, that is, the reset area of the entire block group as a search section instead of resetting the search section for each die, and search for a last access page sequentially from the first page of the reset area or in a binary search manner (S503). MIN may be preset.

When the number of pages included in the reset area is greater than the minimum value MIN (S501: Y), the controller 110 may reset the search section for each die as in the method of step S403 of FIG. 8 or step S415 or step S421 of FIG. 9 (S505).

Although not illustrated in the drawing, in order to search for the last access page, the controller 110 may set the search sections for each die to exclude the same offset for each of the memory blocks in the open block group, sequentially access the first pages of the search sections of each die at the same time, and search for the last access page of the open block group. During the sequential reading of data from the first pages of the search sections of each die, when pages with different program states are consecutively read from a search section of a specific die and offsets of the consecutively read pages are continuous, the controller 110 may determine a valid page of the consecutively read pages as a last access page; however, the present invention is not limited thereto.

Figure 11:
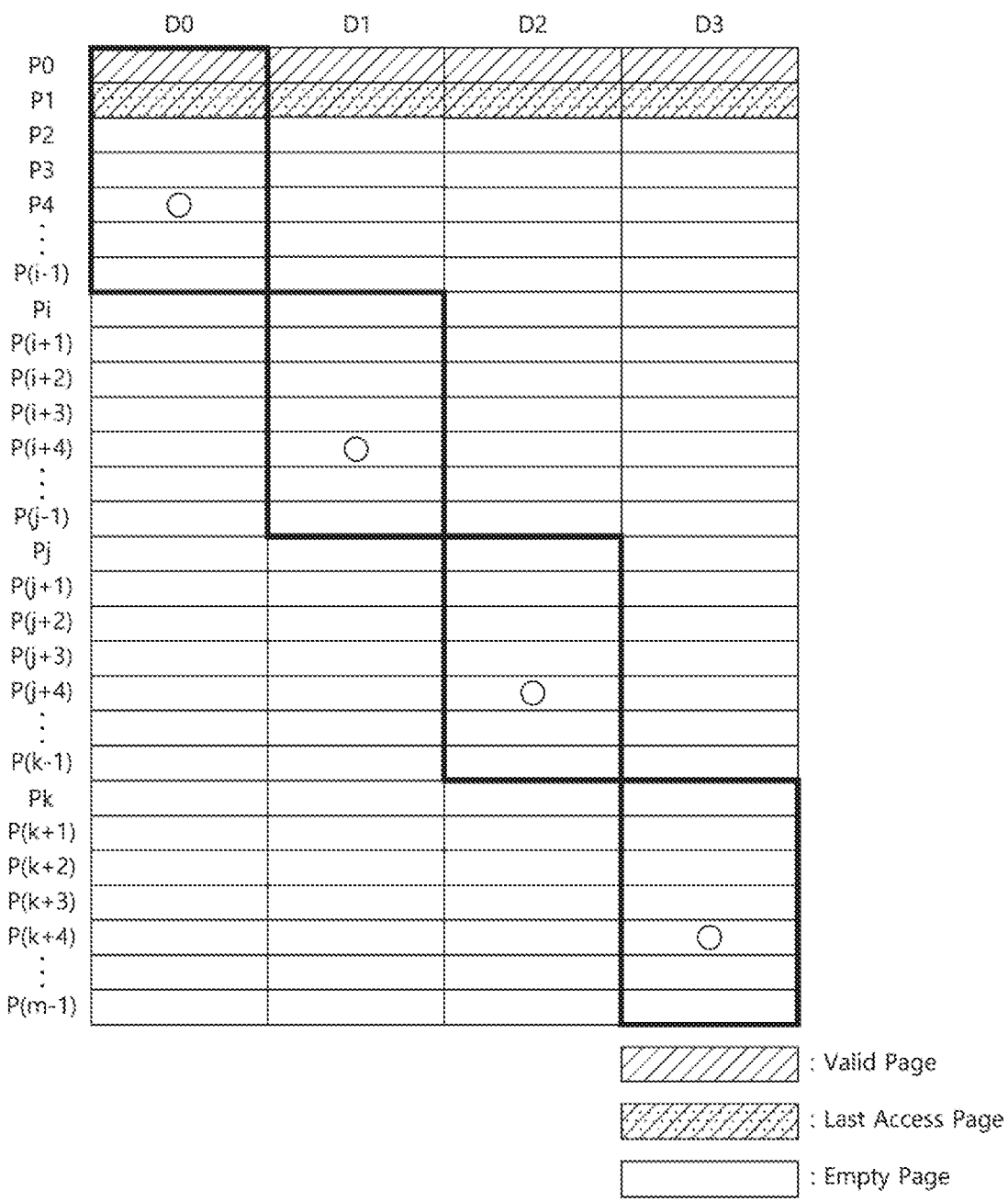
FIG. 11 to FIG. 13 are diagrams for describing an operation method of the data storage device according to the position of a last access page.
Figure 12:
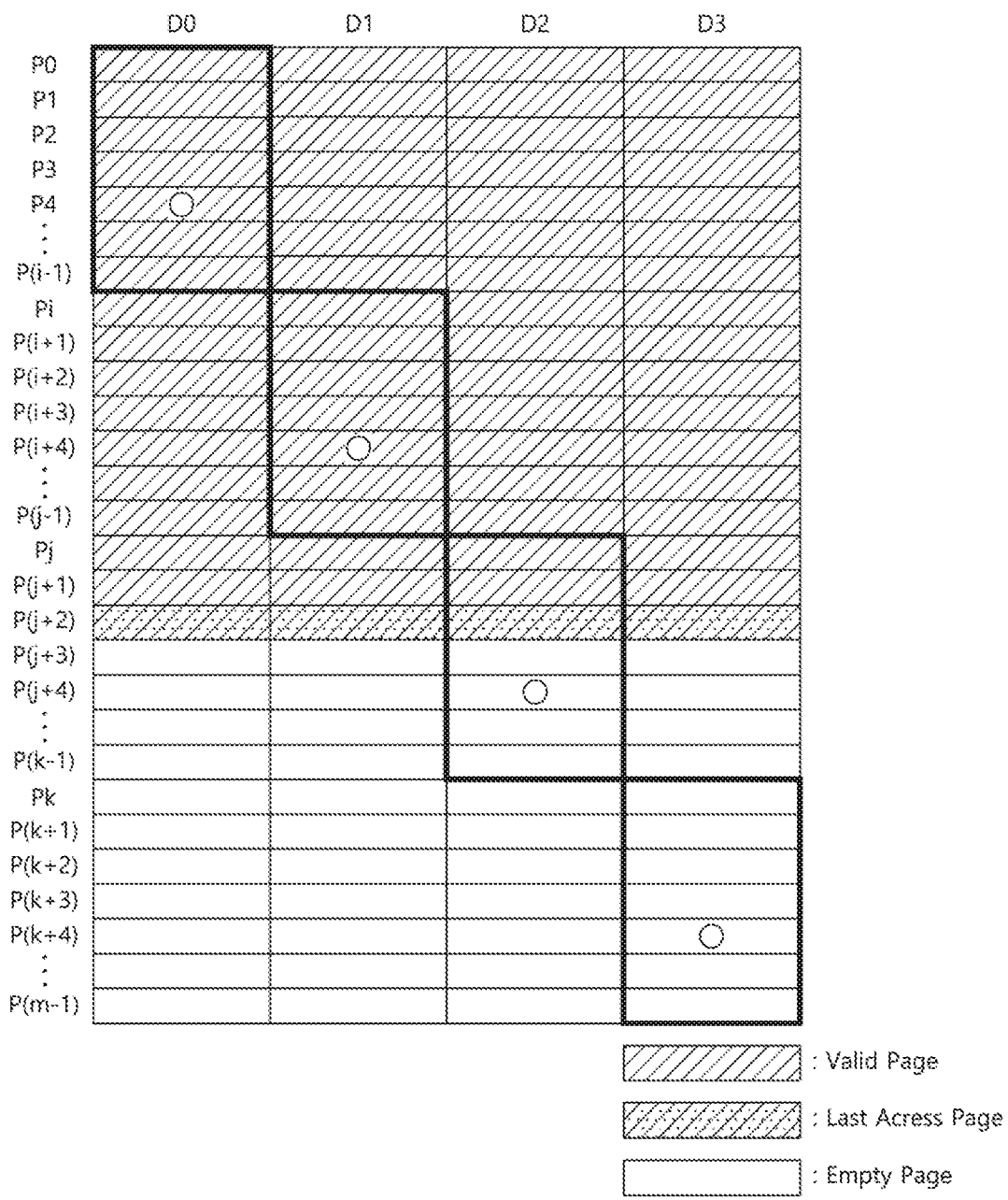
Figure 13:
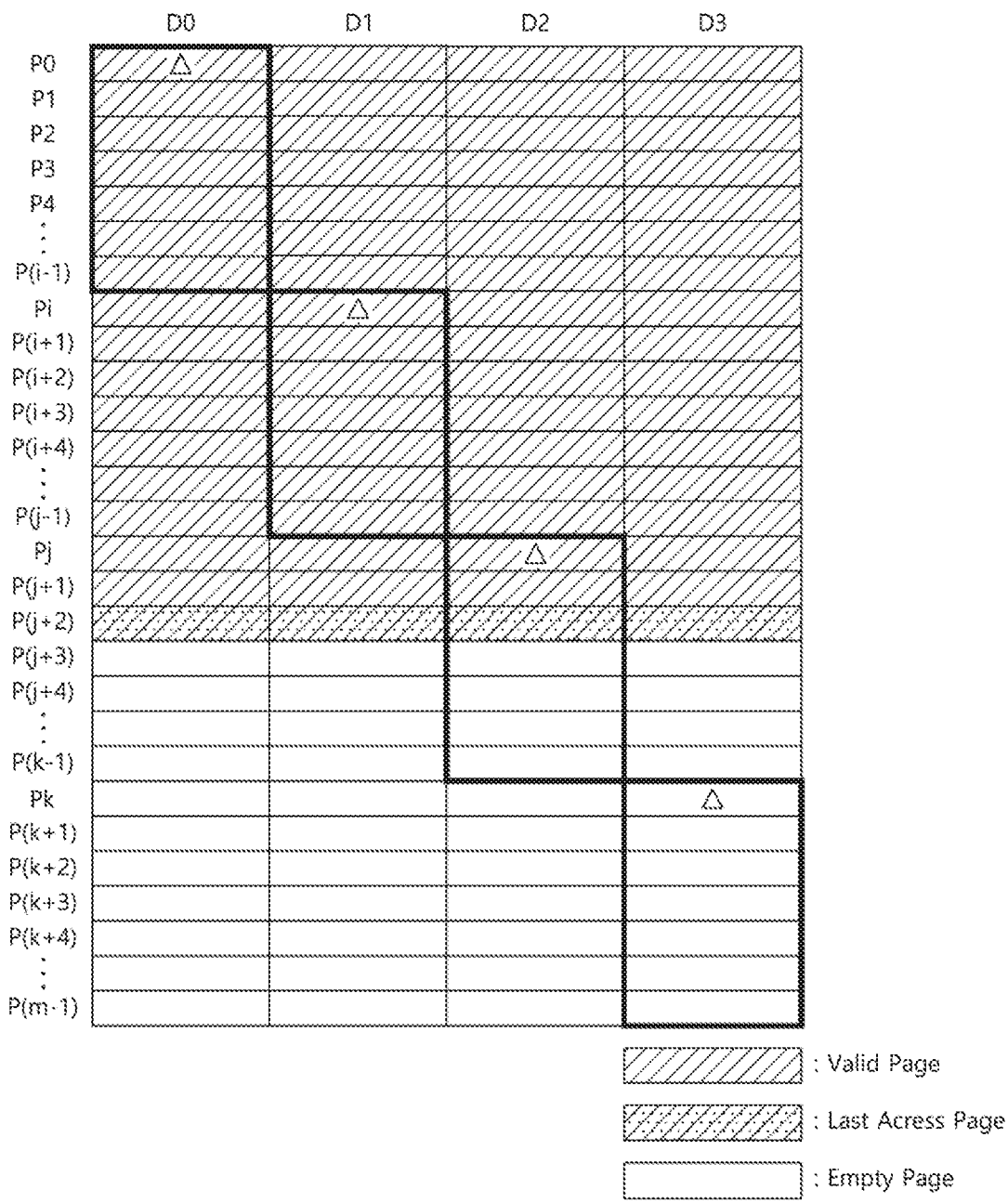

FIG. 11 to FIG. 13 are diagrams for describing an operation method of the data storage device according to the position of the last access page.

FIG. 11 is a diagram for describing a state in which no valid page is found as the result of reading the midpoint pages of the search sections for each die.

Referring to FIG. 11, a search section defined by a thick line may be set for each of dies D0 to D3. For example, the search section of the die 0 (D0) may be set to P0 to P (i−1), the search section of the die 1 (D1) may be set to Pi to P (j−1), the search section of the die 2 (D2) may be set to Pj to P (k−1), and the search section of the die 3 (D3) may be set to Pk to P (m−1).

The midpoint page of each search section for each die is indicated by "o". It can be seen that, as the result of reading all the midpoint pages of the search sections for each die, such pages are determined to be empty pages.

In such a case, as illustrated in FIG. 8, the controller 110 may extract the smallest page number P4 among the page numbers P4, P (i+4), P (j+4), and P (k+4) of the empty midpoint pages.

Then, the controller 110 may set an area from the first page P0 to the immediately preceding page P3 of the extracted page number P4 as a reset area, and reset a search section.

In such a case, when the number (four in the case of FIG. 11) of pages included in the reset area is greater than the minimum value MIN, the controller 110 may reset the search section for each die. On the other hand, when the number (four in the case of FIG. 11) of pages included in the reset area is less than the minimum value MIN, the controller 110 may not reset the search section for each die, and instead may set the entire die, that is, the reset area of the entire block group as a search section and search for a last access page sequentially from the first page or in a binary search manner.

FIG. 12 is a diagram for describing a state in which at least one valid page is found as the result of reading the midpoint pages of the search sections for each die.

Referring to FIG. 12, a search section defined by a thick line may be set for each of dies D0 to D3. For example, the search section of the die 0 (D0) may be set to P0 to P (i−1), the search section of the die 1 (D1) may be set to Pi to P (j−1), the search section of the die 2 (D2) may be set to Pj to P (k−1), and the search section of the die 3 (D3) may be set to Pk to P (m−1).

The midpoint page of each search section for each die may be indicated by "o". It can be seen that the midpoint pages in the die 0 (D0) and the die 1 (D1) are valid pages, and the midpoint pages in the die 2 (D2) and the die 3 (D3) are empty pages, which is the result of reading the midpoint pages of the search sections for each die.

In such a case, as illustrated in FIG. 9, the controller 110 may extract the largest page number P (i+4) between the page numbers P4 and P (i+4) of the valid midpoint pages and extract the smallest page number P (j+4) between the page numbers P (j+4) and P (k+4) of the empty midpoint pages. Then, the controller 110 may set an area between the extracted page numbers P (j+4) and P (i+4) as a reset area, and reset a search section for the reset area.

FIG. 13 is a diagram for describing a case of searching a last access page by sequentially accessing the first pages of the search sections for each die at the same time.

Referring to FIG. 13, a search section defined by a thick line may be set for each of dies D0 to D3. For example, the search section of the die 0 (D0) may be set to P0 to P (i−1), the search section of the die 1 (D1) may be set to Pi to P (j−1), the search section of the die 2 (D2) may be set to Pj to P (k−1), and the search section of the die 3 (D3) may be set to Pk to P (m−1).

The first page of each search section for each die is indicated by "Δ".

In order to search for a last access page, the controller 110 may sequentially access the first pages P0, Pi, Pj, and Pk of the search sections for each die at the same time to search for the last access page of the open block group. During the sequential reading of data from the first pages P0, Pi, Pj, and Pk, when pages with different program states are consecutively read from a search section of a specific die and offsets of the consecutively read pages are continuous, the controller 110 may determine a valid page of the consecutively read pages as the last access page. As illustrated in FIG. 13, it can be seen that a valid page P (j+2) and an empty page P (j+3) are consecutively read in the search section of the die 2 and offsets P (j+2) and P (j+3) of the consecutively read pages are continuous. In such a case, the valid page P (j+2) may be determined as the last access page.

As described above, in embodiments of the present invention, instead of searching for the last access page in a binary search manner with respect to the entire open block group, search sections may be differently specified for each die (block) in the open block group and the search sections of each die are simultaneously accessed, so that it is possible to search for the last access page.

This is based on the characteristic that data is sequentially written from the first page group when a write operation is performed in a die interleaving manner. That is, since the first pages of the search sections of each die are sequentially read or the midpoint pages of the search sections are read, the search sections can be quickly narrowed down for each die according to whether a valid page or an empty page is found, so that it is possible to search for the last access page at a high speed.

Figure 14:
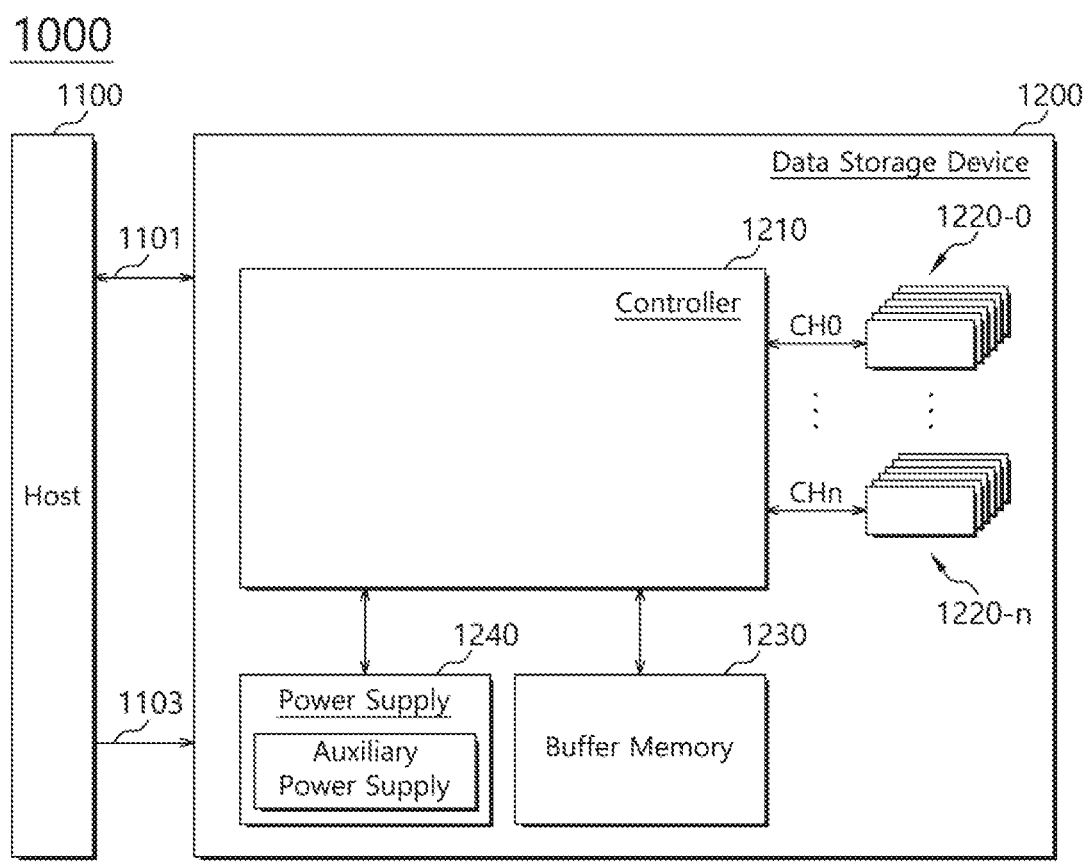
FIG. 14 is a diagram illustrating a data storage system in accordance with an embodiment.

FIG. 14 is a diagram illustrating a data storage system 1000, in accordance with an embodiment.

Referring to FIG. 14, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component, and a memory interface. In an embodiment, the controller 1210 may be configured as controller 110 shown in FIGS. 1 and 4.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 15:
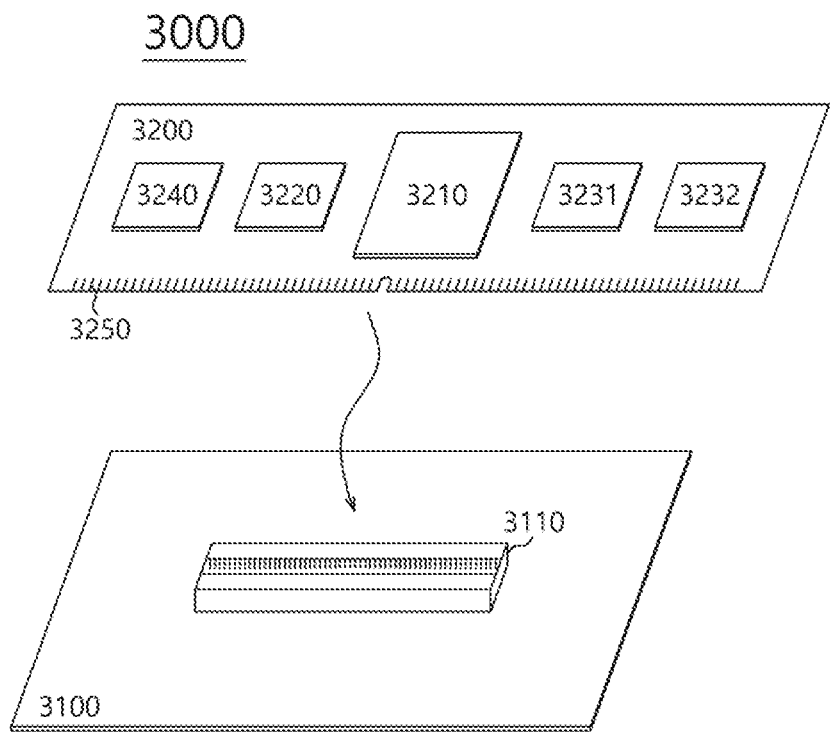
FIG. 15 and FIG. 16 are diagrams illustrating a data processing system in accordance with an embodiment.

FIG. 15 is a diagram illustrating a data processing system 3000, in accordance with an embodiment. Referring to FIG. 15, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 4.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 16:
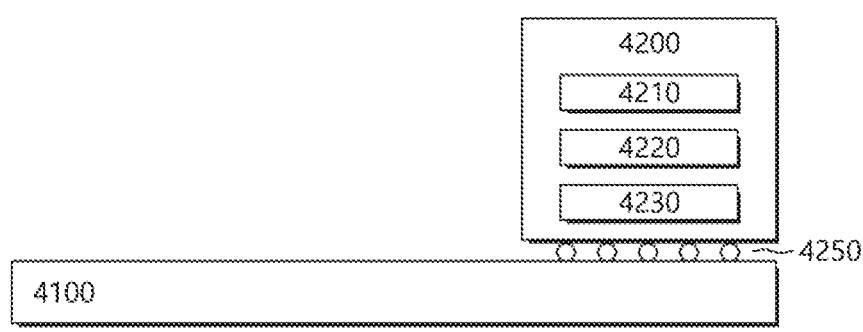

FIG. 16 is a diagram illustrating a data processing system 4000 in accordance with an embodiment. Referring to FIG. 16, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 4.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 17:
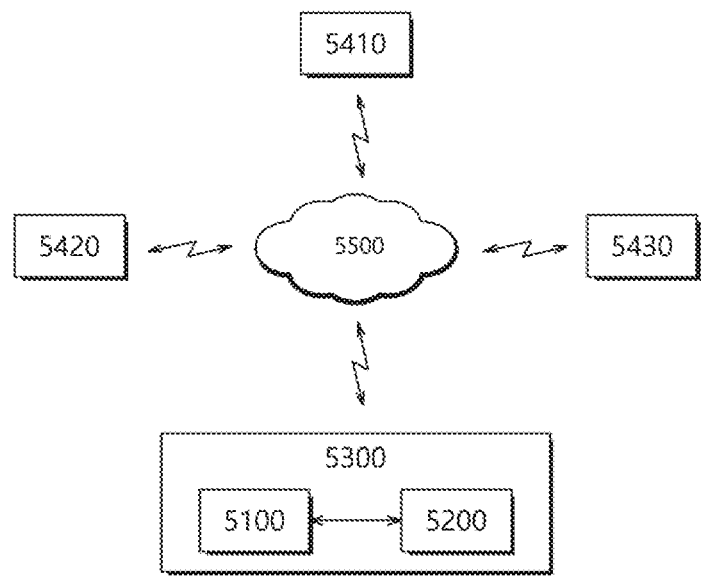
FIG. 17 is a diagram illustrating a network system including a data storage device in accordance with an embodiment.

FIG. 17 is a diagram illustrating a network system 5000 including a data storage device, in accordance with an embodiment. Referring to FIG. 17, the network system 5000 may include a server is system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 14, the memory system 3200 shown in FIG. 15, or the memory system 4200 shown in FIG. 16.

Figure 18:
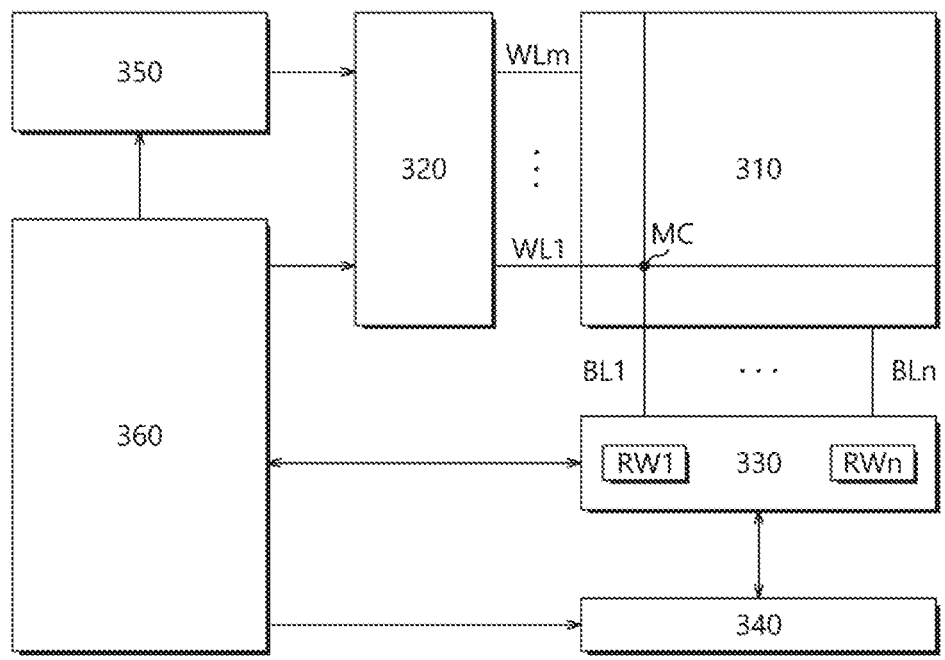
FIG. 18 is a block diagram illustrating a nonvolatile memory device included in a data storage device in accordance with an embodiment.

FIG. 18 is a block diagram illustrating a nonvolatile memory device 300 included in a data storage device, such as the data storage device 10, in accordance with an embodiment. Referring to FIG. 18, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending in a perpendicular direction to the flat surface of a semiconductor substrate. Moreover, the three-dimensional memory array means a structure including NAND strings of which memory cells are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged parallel as well as perpendicular to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been illustrated and described herein, it will be understood to those skilled in the art in light of the present disclosure that the embodiments described are examples only. Accordingly, the present invention is not limited to or by the described embodiments. Rather, the present invention encompasses all modifications and variations that fall within the scope of the claims.

What is claimed is:

1. A data storage device comprising:
  a storage including a plurality of dies, each including a plurality of memory blocks, each including a plurality of pages; and
  a controller configured to select at least one memory block from each of the dies to configure a block group, configure a page group with pages having a same offset in each memory block in each block group, and access the storage in a die interleaving manner,
  wherein the controller is configured to detect an open block group as power is supplied after sudden power off, set search sections for each die including a plurality of blocks in the detected open block group, simultaneously access pages with different page number within the search sections for the dies, and search for a last access page by determining whether the simultaneously accessed pages are valid pages or empty pages.

2. The data storage device according to claim 1, wherein offsets of the pages in the search section for each die do not overlap, and the controller is configured to search for the last access page by sequentially accessing first pages of the search sections for the dies.

3. The data storage device according to claim 1, wherein offsets of the pages in the search section for each die do not overlap, and the controller is configured to search for the last access page in the open block group according to whether midpoint pages in the search sections for the dies are valid pages or empty pages.

4. The data storage device according to claim 3, wherein, when the midpoint pages are all the empty pages, the controller resets a search section for a reset area, which is an area up to an immediately preceding page of the midpoint pages, and searches for the last access page.

5. The data storage device according to claim 4, wherein the controller is configured to extract a page with a smallest page number among the midpoint pages, and the reset area is composed of an area from a first page of the open block group to an immediately preceding page of the extracted page.

6. The data storage device according to claim 3, wherein, when the midpoint page is the valid page, the controller is configured to reset a search section for a reset area, which is an area after a subsequent page immediately after the midpoint pages, and search for the last access page.

7. The data storage device according to claim 6, wherein the controller is configured to extract a page with a largest page number among the midpoint pages, and the reset area is composed of an area from a subsequent page immediately after the extracted page to a last page of the open block group.

8. The data storage device according to claim 3, wherein, when the midpoint pages include empty pages and valid pages, the controller is configured to reset a search section for a reset area, which is an area from a subsequent page immediately after a valid page to an immediately preceding page of an empty page, and search for the last access page.

9. The data storage device according to claim 8, wherein the controller is configured to extract a page with a largest page number among the valid pages and a page with a smallest page number among the empty pages, and the reset area is composed of an area between a subsequent page immediately after the extracted page with the largest page number and an immediately preceding page of the extracted page with the smallest page number.

10. An operation method of a data storage device including a plurality of dies, each including a plurality of memory blocks, each including a plurality of pages, and a controller configured to select at least one memory block from each of the dies to configure a block group, configure a page group with pages having an equal offset in each memory block in each block group, and access the storage in a die interleaving manner, the operation method comprising:
  supplying power after sudden power off;
  detecting, by the controller, an open block group and setting search sections for each die including a plurality of blocks in the detected open block group;
  simultaneously accessing, by the controller, pages with different page number within the search sections for the dies; and
  searching, by the controller, for a last access page by determining whether the simultaneously accessed pages are valid pages or empty pages.

11. The operation method according to claim 10, wherein the setting of the search sections comprises:
  setting the search sections such that offsets of the pages in the search section for each die do not overlap, and
  the searching for the last access page comprises:
  searching for the last access page by sequentially accessing first pages of the search sections for the dies.

12. The operation method according to claim 10, wherein the setting of the search sections comprises:
  setting the search sections such that offsets of the pages included in the search sections for each die do not overlap between the search sections for each die, and
  the searching for the last access page comprises:
  searching for the last access page in the open block group according to whether midpoint pages in the search sections for the dies are valid pages or empty pages.

13. The operation method according to claim 12, wherein the searching for the last access page comprises:
  resetting a search section for a reset area, which is an area up to an immediately preceding page of the midpoint pages, and searching for the last access page, when the midpoint pages are all the empty pages.

14. The operation method according to claim 13, further comprising:
  extracting, by the controller, a page with a smallest page number among the midpoint pages; and
  resetting, by the controller, a search section for the reset area which is an area from a first page of the open block group to an immediately preceding page of the extracted page.

15. The operation method according to claim 12, wherein the searching for the last access page further comprises:
  resetting a search section for a reset area, which is an area after a subsequent page immediately after the midpoint pages, and searching for the last access page, when the midpoint page is the valid page.

16. The operation method according to claim 15, further comprising:
   extracting, by the controller, a page with a largest page number among the midpoint pages; and
   resetting, by the controller a search section for a reset area which is an area from a subsequent page immediately after the extracted page to a last page of the open block group.

17. The operation method according to claim 12, wherein the searching for the last access page further comprises:
   resetting a search section for a reset area, which is an area from a subsequent page immediately after a valid page to an immediately preceding page of an empty page, and searching for the last access page, when the midpoint pages include empty pages and valid pages.

18. The operation method according to claim 17, further comprising:
   extracting, by the controller, a page with a largest page number among the valid pages and a page with a smallest page number among the empty pages; and
   resetting, by the controller, a search section for a reset area which is an area between a subsequent page immediately after the extracted page with the largest page number and an immediately preceding page of the extracted page with the smallest page number, and searching for the last access page.

19. A method of operating a data storage device including dies, each including memory blocks, each including pages, and a controller, the method comprising:
   supplying power to the data storage device after a sudden power off;
   setting, by the controller, a search area for each of the dies, the search areas spanning multiple blocks of an open block group, each search area including pages having different offsets; and
   accessing the search areas simultaneously, by the controller, to search for a last access page;
   wherein a reset area is defined for a subsequent search based on whether or not midpoint pages in the search areas are all empty pages, valid pages or a combination thereof, as determined in the accessing operation.

* * * * *